April 9, 1968  W. H. SQUIER  3,376,849
APPARATUS FOR THE DISTRIBUTION OF GRANULAR MATERIAL
Filed Oct. 14, 1963
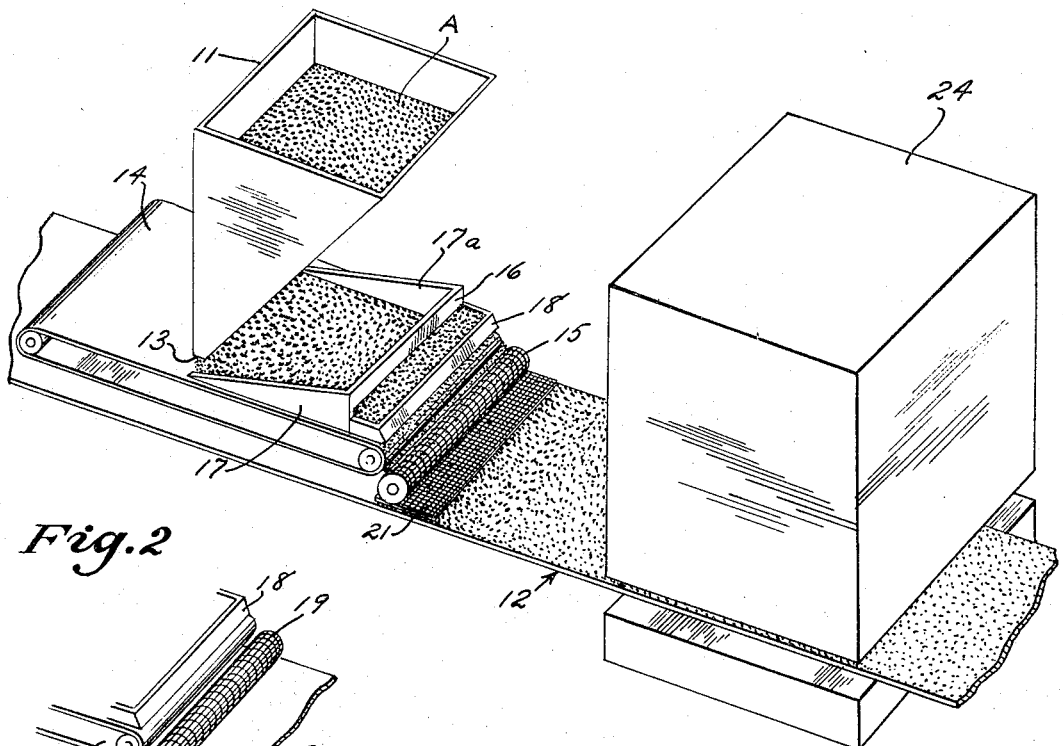
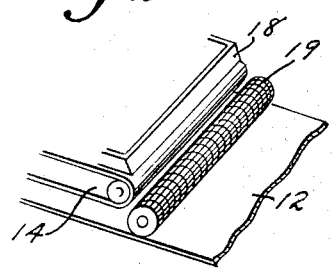
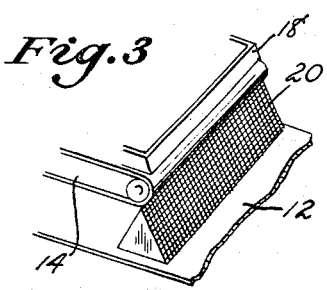
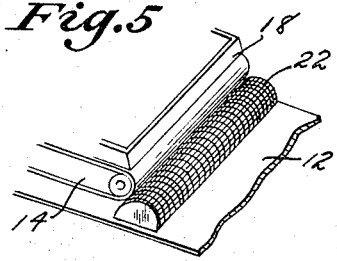
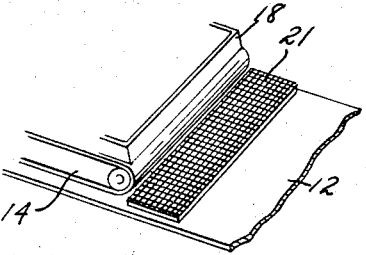
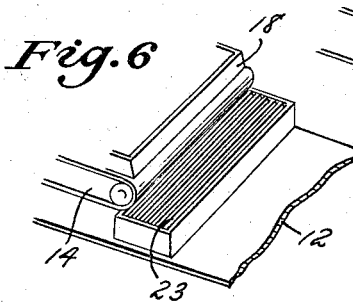
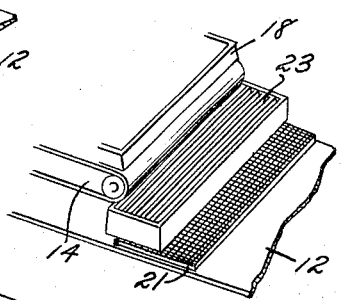
INVENTOR.
WILLIAM H. SQUIER
BY Thomas M. Hammond
ATTORNEY

United States Patent Office 3,376,849
Patented Apr. 9, 1968

3,376,849
APPARATUS FOR THE DISTRIBUTION
OF GRANULAR MATERIAL
William H. Squier, Greenville, S.C., assignor to J. P.
Stevens & Co., Inc., New York, N.Y., a corporation of Delaware
Filed Oct. 14, 1963, Ser. No. 316,009
4 Claims. (Cl. 118—68)

ABSTRACT OF THE DISCLOSURE

An apparatus for distributing granular material having a conveyor belt for conveying granular material from a supply hopper through a rotating dispersing screen and finally onto a surface wherein the granular material is distributed evenly over the entire length and width of said surface.

---

This invention relates to a process and apparatus for distributing granular material. More particularly, the invention relates to a process and apparatus for distributing granular material substantially uniformly on a moving surface.

Although the invention is applicable to a wide variety of industrial processes, it will be explained as it is employed in distributing granular polyethylene in a substantially uniform manner onto the back of a moving carpet strip. In the manufacture of tufted carpets, particularly tufted strip carpet, it is desirable to apply a polyethylene backing or coating on the carpets in order to give them strength, to anchor the pile to a base, such as jute or the like, and to provide a strip which, when cut into the desired lengths, molds readily and permanently to the shape of a surface over which it is to be disposed and also exhibits good bonding of the carpet pile, such as tufts, to the jute padding. This is especially true in those cases where loose tufts are being utilized as pile. Such types of carpets have come into wide use in the automotive field in recent years. Such use requires that the carpets be able to withstand hard wear and that the pile, even though it be in the form of loose tufts, be strong enough to last substantially permanently. Moreover, such carpets should, when molded, be capable of conforming in shape substantially permanently to the floor of the automobile in which they are installed. Consequently, such carpets are generally manufactured with a backing of a coating material in order to anchor the tufts in the base and to give the carpets substantial permanency of strength and shape. One of the more popular ways of accomplishing this is to employ an adhesive or other type of coating as a carpet backing. Synthetic polymeric substances, such as polyethylene, are also employed for this purpose.

In the manufacture of such carpets, a coating must be substantially uniform with respect to its depth or thickness throughout the entire length and width of the surface area of the carpet in order to achieve good moldability and especially to achieve uniformity with respect to anchoring the tufts and bonding them to the jute padding. This is particularly so when polymeric substances are used as backing materials. Polyethylene backings are normally applied to such carpets by utilizing granular polymer, distributing it over the surface of the carpet and subjecting the carpet having the distributed polyethylene granules present thereon to an elevated temperature sufficient to flow said polyethylene and form a coating of polymer on the back of said carpet. Problems have been encountered, however, in obtaining manufactured carpets which have a polyethylene coating which is substantially uniform over the entire area on the back of the carpet and which meets, therefore, the standards required for good moldability and substantially permanent and uniform anchoring of the tufts in the padding. The present invention obviates these problems and achieves even and substantially uniform distribution of granular polyethylene over the entire surface of the back of a carpet or other strip material being processed and where pile materials having loose tufts are utilized, substantially permanent and uniform anchoring or fixing thereof.

In its broadest concept the present invention comprises a process for dispensing granular material to form a substantially uniform coating on a moving surface by distributing said granular material from a source of supply to a conveyor and subsequently transferring said granular material from said conveyor to a surface which is moving at a speed sufficient to permit substantially even distribution of granular material over the entire area thereof. Preferably, transfer of the granular material from the moving conveyor to the moving surface to which it is to be applied in a substantially uniform coating is accomplished by passage of the granular material from the conveyor to a dispersing means, such as a screen or the like, disclosed more fully hereinbelow, which causes the material to be dispersed substantially evenly over the entire area of the surface on which the granular material is to be dispersed. The dispersing means can be stationary or it can be moving in relation to both the conveyor and the moving surface onto which the dispersing means disperses the granular material. Depending upon the particular construction of the dispersing means, the movement thereof can vary in its relationship to both the conveyor and the moving surface which receives the granular material from the dispersing means. For example, the dispersing means can have either a vibratory motion or a rotary motion. Generally, it is preferred that the dispersing means have a rotary motion, and, when such motion is employed, the direction of movement is either clockwise or counterclockwise. Clockwise motion is, however, preferred. Both the conveyor and the moving surface onto which the granular material is to be dispersed by said dispersing means have a forward movement.

In order to achieve substantially uniform distribution of granular material over the entire area of the surface which receives said granular material from the dispersing means, the relative movements and speeds of the conveyor, the dispersing means, and the moving surface which receives granular material from the dispersing means are adjusted in relation to each other within a wide range of variation. Generally, the speed of the conveyor which receives granular material from a source of supply is slower in forward motion than the speed of the moving surface, which receives granular material from the dispersing means. Both the speed of the conveyor and the speed of the moving surface are adjustable to achieve optimum performance. This is governed by product requirements. Generally, in the manufacture of automotive carpets, referred to above, the conveyor speed is adjusted to the carpet speed to deposit exactly 2 mils for most applications. Normally, in order to get the desired deposition in the manufacture of the described carpets, both the conveyor and the moving surface to which the granular material is to be applied move forward along parallel directional paths at speeds in a range of about 20 to 40 feet per minute and about 55 to 90 feet per mniute, respectively, and preferably in a range of about 30 to 35 feet per minute and about 70 to 80 feet per minute, respectively. On the other hand, the dispersing means, if it has a vibratory motion, should vibrate vigorously in order to prevent the formation of any pattern of the granular material as it is received on the moving surface from the dispersing means and which might be caused by the vibratory motion. However, when the dispersing means has a rotary motion, generally a speed in a range of about 10 to 430 revolutions per minute and preferably in a range of about 125 to 135 revolutions per minute is employed in carrying out the process of this invention. When preferred speeds are utilized, the dispersing means causes distribution of the granular material in both a forward and rearward direction, thereby causing a substantially unifom distribution of the material over the surface on which it is being dispersed. Moreover, in order to achieve substantially uniform coating on the surface to which the granular material is to be supplied, the amount of material transferred from the source of supply to the moving conveyor then to the second moving surface to which it is to be applied can be readily adjusted by mechanical means. For example, the doctor bar, described hereinbelow, controls coarse adjustment in weight of polyethylene being distributed, and speed controls fine adjustment. The particular speeds best suited for either the conveyor, dispersing means, or moving surface to which granular material is to be applied are readily determinable by experimentation.

After the granular material has been uniformly dispersed over the entire area of the moving surface to which it is to be applied in a substantially continuous layer of uniform thickness, the surface over which the granular material is distributed is conveyed into a heating zone having an elevated temperature in order to form a continuous coating of granular material on the surface. In this connection, the temperature of the heating zone can vary widely, depending on the nature of the granular material being utilized. For example, if granular low density (.916–.930) polyethylene is being employed to form a continuous coating, the temperature of the heating zone is generally in a range of about 450° F. to 600° F. and preferably in a range of about 500° F. to 550° F. The speed at which the material passes through the elevated temperature zone can vary greatly. Naturally, traversal through the heating zone by the moving surface over which the granular material is distributed must occur at speeds low enough to process the granular material so it forms a substantially continuous uniform coating on the surface over which it is distributed. Furthermore, the surface over which the granular material is distributed must not be damaged in its traversal through the zone of elevated temperature. For example, if one is distributing granular polyethylene on a loosely tufted carpet strip, in carrying out the process of this invention, the carpet strip must pass through the zone of elevated temperature without damaging the tufts or backing thereof. Generally speaking, good continuous coatings are obtained on the surface over which the granular material is distributed if traversal of the heating zone takes place at a speed in a range of about 55 to 90 feet per minute and preferably in a range of about 70 to 80 feet per minute. The speed of traversal will, of course, depend upon the granular material being employed, the nature of the surface material over which it is distributed, and the temperature necessary to form a continuous coating of the granular material. In this connection an excellent continuous coating of polyethylene can be made on the back of a strip of loosely tufted automotive carpet by passing the carpet strip through a series of furnaces wherein a temperature of about 500° F. to 550° F. is maintained and wherein the strip travels at a rate of about 70 to 75 feet per minute.

Apparatus which can be employed to carry out the process described hereinabove can vary within wide limits of design. However, regardless of the particular design of the apparatus utilized, it will fundamentally include a supply means, such as a supply hopper or the like, which is equipped with an outlet, a first conveying means, such as a conveyor belt, dispersing means described in greater detail hereinbelow, and finally a surface onto which granular material is distributed or dispersed through said dispersing means. In order to more clearly understand the instant process and apparatus therefor, reference is made to the accompanying drawing wherein:

FIGURE 1 is a diagrammatic view in perspective of apparatus for carrying out the process of the invention;

FIGURE 2 is a view in perspective of a preferred embodiment of the dispersing means;

FIGURE 3 is a view in perspective of another embodiment of the dispersing means;

FIGURE 4 is a view in perspective of still another embodiment of the dispersing means according to the invention;

FIGURE 5 is a view in perspective of still another embodiment of a dispersing means according to the invention;

FIGURE 6 is a view in perspective illustrating the use of separator plates to perform the dispersing function; and FIGURE 7 is a view in perspective illustrating the use of a dispersing means which includes a combination of separator plates and a flat screen.

Referring more particularly to the drawings, 11 indicates a supply hopper or the like containing granular material, A, such as, for example, granular polyethylene, which is to be distributed on the back of a moving surface 12, such as a strip of loosely tufted automotive carpet, the tufted surface not being shown in detail. The supply hopper 11 is equipped with an outlet 13 and is disposed above a conveying means, such as an endless conveyor belt 14, which moves in a forward direction, thereby carrying granular material away from the outlet of the supply hopper and toward dispersing means 15 which is located forward of and below the conveyor belt 14. In order to prevent loss of granular material, a mechanical dam is disposed slightly above the surface of the conveyor belt. This dam has a front member 16 and two lateral wings 17 and 17a, respectively, which contact the conveyor belt, thereby retaining granular material within an area having dimensions no wider than the width of the coveyor belt. The dam is held in proper position by structural means located on the opposite side of the apparatus and not shown. The front member 16 of the mechanical dam is adjustable and is disposed slightly above the surface of the belt in order to allow granular material to pass thereunder. The height between the front member of the dam and the surface of the belt can be varied according to needs. Positioned forward of the front member of the mechanical dam and slightly above the surface of the conveyor belt is a doctor blade 18 which also aids in maintaining the granular material at the desirable height or thickness on the conveyor belt, thereby permitting the delivery of a desired amount of granular material to said dispersing means 15. As shown, the doctor blade is anchored to the lateral wings of the dam, although any suitable way to brace or attach it can be utilized.

The dispersing means 15 can vary widely in construction. In its most preferred form, the dispersing means is a cylindrical screen 19 as shown in FIGURE 2 in detail, and the periphery of which rotates in either a clockwise or counterclockwise direction. Preferably, however, it rotates in a clockwise direction. The construction of the dispersing means can be varied as shown at 20 in FIGURE 3 wherein it is triangular shaped. Other shapes which can be utilized in the construction of the dispersing means include the flat screen 21, such as that shown in FIGURE 4, a semicircular construction 22, such as that shown in FIGURE 5, vertically disposed separator plates 23 as shown in FIGURE 6 or a combination of a screen and separator plates as shown in FIGURE 7 wherein a flat screen is utilized. In each of the constructions illustrated, except the separator plates, and shown in those figures referred to immediately hereinabove, the surface of the dispersing means is made from a screen or like material which will permit passage of granular material therethrough. The mesh size can vary, depending upon the particular needs necessitated by operation of the process. For example, a relatively fine mesh screen can be utilized when the granular material being dispersed therethrough and thereby is of relatively fine particle size. On the other hand, it is generally preferred that the screen be of a large enough mesh size so that substantially all of the granular material passes therethrough and patterns of dispersion of granular material on the moving surface on which it is being dispersed are not formed. When any of the constructions other than the flat screen or separator plates are utilized as a dispersing means in carrying out the practice of the instant invention, a motor or other means (not shown) is employed in order to rotate the dispersing means in the same direction as the direction of movement of both the conveyor belt and the moving surface onto which the granular material is to be dispersed. When a flat screen is utilized, a source of power is connected thereto in order to cause vibration and bring about passage of substantially all of the granular material through the screen and onto the moving surface in a substantially uniform thickness.

It is to be noted as clearly shown in the accompanying drawing that when separator plates are utilized to disperse the granular material in accordance with this invention, they are disposed over the moving surface on which the granular material is to be dispersed in a vertical manner and directed so that at least part of the plates are slanted off center in order that the granular material is spread in a lateral direction as it falls through the plates. In another embodiment of the dispersing means a semicircular screen can be utilized, or, if desirable, one or more horizontally disposed perforated separator plates (not shown) can be used to disperse the granular material substantially evenly onto the moving surface over which it is to be applied.

As pointed out heretofore, the instant process and apparatus are particularly applicable to the dispersing of granular material onto the back of a moving surface of a strip or web 12 so that a layer of uniform thickness is deposited thereon. In order to form a substantially continuous coating on said web or other material such as strip carpet, the strip or web covered with the uniform layer or a layer uniform thickness of granular material is passed through an oven or other heating means 24 to form a coating of substantially uniform thickness from said granular material. The particular design of the heating means is immaterial in carrying out the practice of this invention. However, preferred heating means are gas fired ovens equipped with rolls or other means (not shown) for conveying the strip material therethrough. At the exit end of the ovens there is a take-up roll (not shown) for receiving the strip material which has a continuous coating thereon after it has passed through the heating zone. If desirable, cooling means can also be utilized to chill the coated strip after it comes from the heating means and before it is collected on the take-up roll.

The process and apparatus of this invention present many advantages. For example, in the manufacture of automotive strip carpet material having a continuous polyethylene coating on the back thereof, a substantially uniform coating is achieved by carrying out the instant process thereby resulting in a product which exhibits better properties of moldability when the strip material is cut into specified lengths and passed through molding machines to give them shape similar to that of the floor of an automobile in which they are to be employed. Moreover, the illustration of the instant process and apparatus permits a uniform dispersion of material and thereby presents obvious economic advantages by elimination of use of excess granular polyethylene or other material. Furthermore, substantially permanent and uniform achoring of tufts to jute backing is achieved in carpet manufacture even though less polyethylene is applied, and, with a coating of about 12 mils thickness, the individual tufts more than meet the requirements of at least 6 pounds of force before separation from the jute backing.

It will be understood to those skilled in the art that many apparently widely different embodiments of the instant process and apparatus can be made without departing from the spirit and scope thereof. Accordingly, it is to be understood that this invention is not to be limited to the specific embodiments thereof except as defined in the appended claims.

What is claimed is:

1. Apparatus for uniformly dispensing granular material onto a moving surface comprising a source of supply, a conveying means positioned below and in relatively close spaced relationship with the outlet of said source of supply, leveling means positioned at a fixed distance above the surface of said conveying means, and a rotating cylindrical screen having a mesh size sufficient to permit the passage of granular material therethrough positioned below and ahead of said conveying means to receive granular material from said conveying means and uniformly distribute said granular material on a moving surface positioned below both said conveying means and said dispersing means.

2. Apparatus for dispensing granular material onto a moving surface to form a substantially uniform coating on said moving surface comprising a supply hopper for said granular material, an endless conveyor belt disposed below the outlet of said supply hopper, a mechanical dam positioned over said conveyor belt to regulate the amount of granular material which is conveyed by said conveyor belt in a forward direction, a rotating screen having a mesh size sufficient to permit the passage of granular material therethrough positioned forward of and below said conveyor belt and adapted to receive said granular material from said conveyor belt, and a moving surface positioned below said rotating screen and adapted to receive the granular material from said rotating screen in a substantially uniform manner.

3. Apparatus as defined in claim 2 wherein a heating means is disposed forward of said moving surface which receives the granular material from said rotating screen and through which heating means said moving surface having said granular material dispersed thereon is passed to form a continuous coating of said granular material on said moving surface.

4. Apparatus for dispensing granular material onto a moving surface to form a substantially uniform coating on said surface comprising a supply hopper for said granular material, an endless conveyor belt disposed below the outlet of said supply hopper, a mechanical dam positioned over said conveyor belt to regulate the amount of material which is conveyed by said conveyor belt in a forward direction, a doctor blade positioned forward of said mechanical dam to adjust the level of granular material being conveyed forward on said conveyor belt, a rotating cylindrical dispersing screen having a mesh size sufficient to permit the passage of granular material therethrough positioned ahead of and below said conveyor belt and a second moving surface positioned below both said conveyor belt and said dispersing screen.

References Cited

UNITED STATES PATENTS

| | | | |
|---|---|---|---|
| 858,508 | 7/1907 | Goldman | 118—308 XR |
| 2,276,487 | 3/1942 | Harshberger | 117—20 |
| 2,513,434 | 7/1950 | Tinsley | 118—308 XR |
| 2,661,303 | 12/1953 | Pasold et al. | 117—25 XR |
| 2,746,096 | 5/1956 | Baxter et al. | 118—308 XR |
| 2,753,099 | 7/1956 | Jenner et al. | 141—131 XR |
| 2,775,532 | 12/1956 | Sallie et al. | 118—308 XR |
| 2,789,926 | 4/1957 | Finholt et al. | 118—308 XR |
| 2,936,814 | 5/1960 | Yakubik | 117—21 XR |
| 2,962,381 | 11/1960 | Dobry et al. | 118—308 XR |
| 2,990,873 | 7/1961 | Fahrni | 141—134 XR |
| 3,152,012 | 10/1964 | Schaffert | 117—17.5 |
| 3,105,770 | 10/1963 | Lehmann et al. | 117—17.5 |
| 3,170,808 | 2/1965 | Almy et al. | 117—20 |

WILLIAM D. MARTIN, *Primary Examiner.*

P. ATTAGUILE, *Assistant Examiner.*